July 17, 1928.
L. H. SPRINKLE
ARTIFICIAL TEETH
Filed Feb. 4, 1926
1,677,662
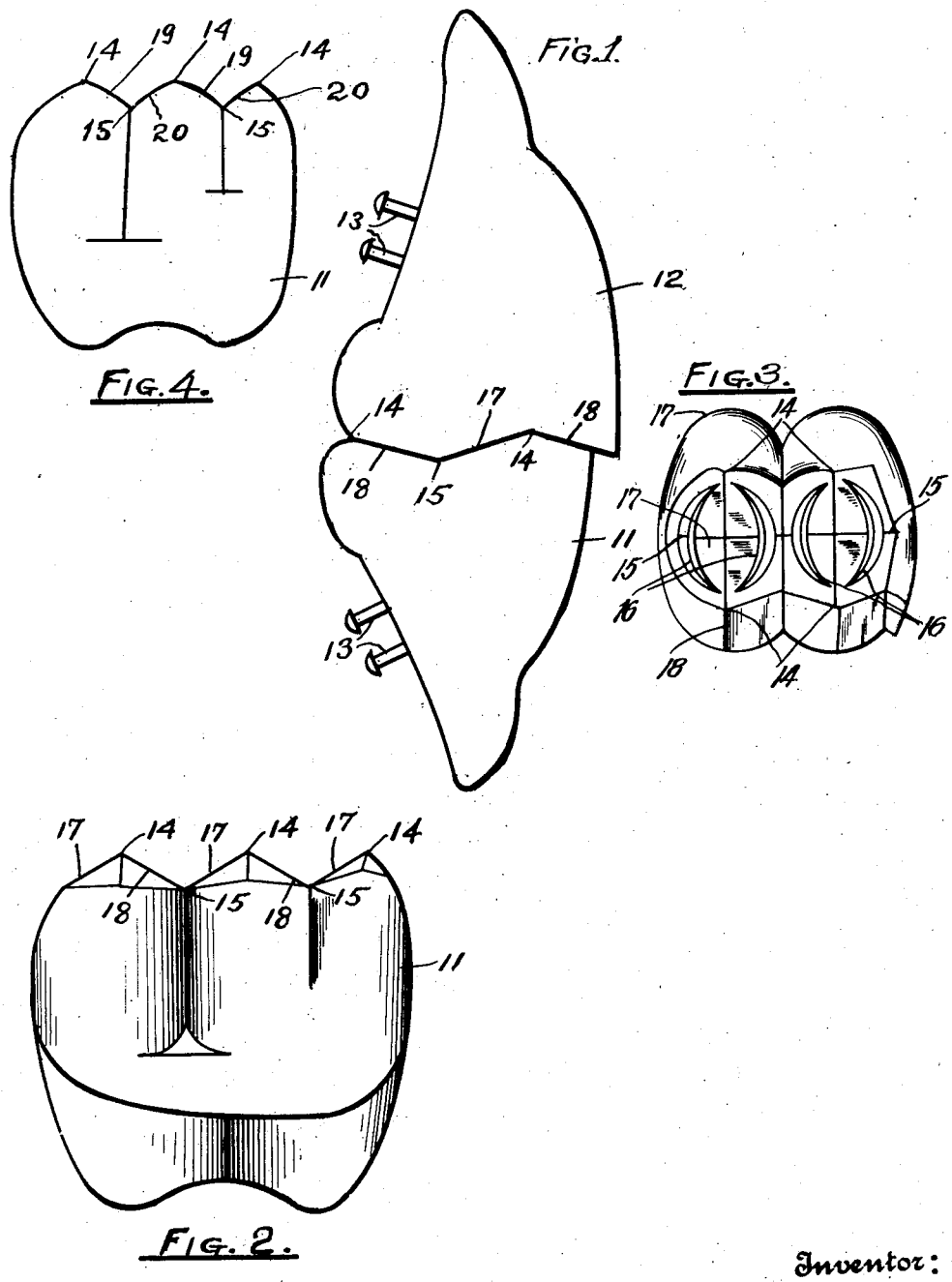
Inventor:
Lake H. Sprinkle,
By his Attorney
Israel Benjamin.

Patented July 17, 1928.

1,677,662

UNITED STATES PATENT OFFICE.

LAKE H. SPRINKLE, OF BROOKLYN, NEW YORK.

ARTIFICIAL TEETH.

Application filed February 4, 1926. Serial No. 86,087.

My invention relates to artificial teeth and facings made of porcelain or any other suitable material, and it consists in the novel features hereinafter described.

One of the objects of my invention is to enable the teeth of dentures to masticate food in a more perfect manner, and without tilting the dentures.

Another object of my invention is to enable the artificial teeth of dentures to allow a more correct articulation of speech.

A further object of my invention is to prevent food from being jammed into fissures of bicuspids and molars, thereby preventing the breaking of the suction of the upper or lower plate of a set of artificial teeth.

A still further object of my invention is to prevent the interlocking of teeth in dentures, thereby facilitating the process of mastication and articulation of speech.

Other objects and advantages will hereinafter appear.

I attain these objects by the artificial teeth or facings, two forms of which are illustrated in the accompanying drawings, or by any mechanical equivalent or obvious modification of the same.

In the drawings Fig. 1 is a side elevation on an enlarged scale of upper and lower teeth in contact with each other and having their working surfaces of an improved form, embodying my invention.

Fig. 2 is a front elevation (or view from the buccal side) of a molar tooth or facing embodying my invention.

Fig. 3 is a plan view of the tooth or facing shown in Fig. 2, which is also drawn to a large scale.

Fig. 4 is a view similar to Fig. 2, but showing a somewhat different form of the working surface of the tooth or facing.

Similar numerals refer to similar parts throughout the several views.

11 designates the body of a lower tooth or facing and 12 that of an upper tooth or facing, each of which is shown in Fig. 1 as containing the customary pins 13 for attaching the tooth to a plate or the facing to a backing.

The working surfaces of the teeth or facings 11 are shown in Figs. 1, 2, and 3 as containing elevations or ridges 14, depressions 15, fissures 16, and sloping surfaces 17 and 18 extending in a direction from the outside of the mouth towards the inside thereof and vice versa, and also transversely to said directions, thereby forming diamond shaped projections 21 on said teeth or facings, as shown in Fig. 3.

In my artificial teeth or facings I make the sloping surfaces 17 or 18, which extend in the same direction from elevations or ridges 14 to neighboring depressions 15, inclined planes which are substantially parallel to each other, as shown in Figs. 1 and 2.

Moreover I make the working surfaces of the upper teeth counterparts of the working surfaces of the lower teeth, as if the former were made by taking a mold of the latter, as shown in Fig. 1.

In other words, either of the sets of slopes 17 or 18 of my artificial teeth and facings, which are inclined in the same direction, make equal angles with a plane passing through any point in said slopes.

In Figs. 1 and 2 the slopes 17 and 18, which are inclined in opposite directions, also make equal angles with a plane passing therethrough.

By means of the above described features the upper and lower teeth have their successive positions during the operation thereof substantially parallel to each other, whereby the teeth operate in a more perfect manner, without tilting the plates, and whereby all the other of the above enumerated objects are attained.

In the modification shown in Fig. 4 the slopes 19 and 20 are curved instead of being planes as in Figs. 1 and 2, the curves being shown as convex upwardly; but they may also be otherwise curved, if desired; the corresponding slopes 19 or 20 are of such a shape and so disposed as to cause the teeth to have their successive positions during the operation thereof substantially parallel to each other.

The slopes 19 and 20 in Fig. 4, as well as 17 and 18 in Fig. 2, which show the preferred form of my teeth or facings, are shown as equally inclined; but this is not indispensable as long as the slopes extending in the same direction, such as the slopes 19 or 17, are equally inclined the teeth will work in a satisfactory manner.

Many other changes may be made in the form of my artificial teeth and facings, without departing from the main scope of my invention.

I do not, therefore, restrict myself to the exact form of the teeth as shown in the drawings; but I intend to include also all mechanical equivalents and obvious modifications of the same within the scope of my invention.

Wherever in the claims the term "outer side" is employed, it is meant to designate either the buccal side or the labial side.

I claim as my invention and desire to secure by Letters Patent:

1. In artificial teeth or facings, having therein elevations and depressions, sloping surfaces diverging from said elevations and extending to said depressions, the inclinations of said surfaces being in opposite directions to each other, and other sloping surfaces diverging from said elevations and extending to said depressions, the inclinations of said last mentioned surfaces being in directions substantially transversely to the inclinations of said first mentioned surfaces, and the inclinations of all of said surfaces being so disposed as to cause said teeth or facings, when the latter are moved in any direction to have their successive positions substantially parallel to each other.

2. In artificial teeth or facings, having therein elevations and depressions, sloping surfaces diverging from said elevations and extending to said depressions, the inclinations of said surfaces being in opposite directions to each other, and other sloping surfaces diverging from said elevations and extending to said depressions, the inclinations of said last mentioned surfaces being in directions substantially transversely to the inclinations of said first mentioned surfaces, the inclinations of all of said surfaces being so disposed as to cause said teeth or facings, when the latter are moved in any direction, to have their successive positions substantially parallel to each other, and the working surfaces of the upper teeth being exact counterparts of the working surfaces of the lower teeth.

3. In artificial teeth or facings having therein elevations and depressions, sloping surfaces diverging in pairs from said elevations in more than two directions, and extending to said depressions, the inclination of said surfaces being so disposed as to cause said teeth or facings when the latter are moved in any direction, to have their successive positions substantially parallel to each other.

Executed on the second day of February, 1926.

LAKE H. SPRINKLE.